United States Patent [19]

Cage et al.

[11] Patent Number: 4,823,613
[45] Date of Patent: Apr. 25, 1989

[54] DENSITY INSENSITIVE CORIOLIS MASS FLOW RATE METER

[75] Inventors: Donald R. Cage, Longmont; Gerald M. Grammens, Boulder, both of Colo.

[73] Assignee: Micro Motion, Inc., Boulder, Colo.

[21] Appl. No.: 192,706

[22] Filed: May 11, 1988

Related U.S. Application Data

[63] Continuation of Ser. No. 914,932, Oct. 3, 1986, abandoned.

[51] Int. Cl.⁴ .............................................. G01F 1/84
[52] U.S. Cl. ..................................... 73/861.38; 73/3
[58] Field of Search .................... 73/861.37, 861.38, 3

[56] References Cited

U.S. PATENT DOCUMENTS

| | | |
|---|---|---|
| 2,831,349 | 4/1958 | Altfillisch et al. |
| 2,865,201 | 12/1958 | Roth .................................. 73/861.38 |
| 2,923,154 | 2/1960 | Powers et al. |
| 2,956,431 | 10/1960 | Westerheim ............................ 73/32 |
| 3,339,400 | 9/1967 | Banks ...................................... 73/32 |
| 3,385,104 | 5/1968 | Banks .................................. 73/67.2 |
| 3,449,941 | 6/1969 | Banks ...................................... 73/32 |
| 3,812,723 | 5/1974 | Barron .................................. 73/434 |

FOREIGN PATENT DOCUMENTS 159678 12/1963 U.S.S.R.
171651 7/1965 U.S.S.R.
0083144 7/1983 United Kingdom.

Primary Examiner—Herbert Goldstein

[57] ABSTRACT

Design criteria for Coriolis mass flow rate meters with flow conduits having two modes of oscillation where the ratio of the resonant frequencies for the two modes is held constant irrespective of changes in the density of the fluid passing through the flow conduits. The design criteria embodied in the requirement that the ratio of modal mass to modal inertia for a flow conduit equal the ratio of the mass of all attachments to the flow conduit divided by the inertia of attachments to the flow conduit.

6 Claims, 3 Drawing Sheets

DENSITY INSENSITIVE CORIOLIS MASS FLOW RATE METER

This application is a continuation of prior application Ser. No. 914,932, filed Oct. 3, 1986, now abandoned.

BACKGROUND OF THE INVENTION

The present invention relates to Coriolis mass flow rate meters that include oscillating flow conduits. The flow conduits used in these Coriolis mass flow rate meters are mounted so they can oscillate at resonance frequencies about at least two axes. One of the axes is associated with externally applied forces used to oscillate each flow conduit. The other axis is associated with deflections of each flow conduit caused by Coriolis forces arising from the combination of the driven oscillation and flow of fluids through the flow conduit. For the present invention the flow conduits are designed so as to have the ratio of both resonance frequencies remain constant even when the mass of the flow conduits change because the density of the fluid passing through the flow conduits changes.

DESCRIPTION OF THE PRIOR ART

In the art of measuring mass flow rates of flowing substances it is known that flowing a fluid through an oscillating flow conduit induces Coriolis forces to act on the conduit. It is also known that the magnitudes of such Coriolis forces are related to both the mass flow rate of the fluid passing through the conduit and the angular velocity at which the conduit is vibrated.

One of the major technical problems previously associated with efforts to design and make Coriolis mass flow rate instruments was the necessity either to measure accurately or control precisely the angular velocity of an oscillated flow conduit so that the mass flow rate of the fluid flowing through the flow conduits could be calculated using measurements of effects caused by Coriolis forces. Even if the angular velocity of a flow conduit could be accurately determined or controlled, precise measurement of the magnitude of effects caused by Coriolis forces was another severe technical problem. This problem arises in part because the magnitude of generated Coriolis forces is very small, therefore resulting Coriolis force induced effects are minute. Further, because of the small magnitude of the Coriolis forces, effects resulting from external sources such as invariably present vibrations induced, for example, by neighboring machinery or pressure surges in fluid lines cause erroneous determinations of mass flow rates. Such error sources may even completely mask the effects caused by generated Coriolis forces rendering a flow meter useless.

A mechanical structure and measurement technique which, among other advantages: (a) avoids the need to measure or control the magnitude of the angular velocity of a Coriolis mass flow rate instrument's oscillating flow conduit; (b) concurrently provides requisite sensitivity and accuracy for the measurement of effects caused by Coriolis forces; and, (c) is not susceptible to errors resulting from external vibration sources, is taught in U.S. Pat. No. Re. 31,450, entitled Method and Structure for Flow Measurement and issued Nov. 29, 1983; U.S. Pat. No. 4,422,338 entitled Method and Apparatus for Mass Flow Measurement and issued Dec. 27, 1983; and U.S. Pat. No. 4,491,025 entitled Parallel Path Coriolis Mass Flow Rate Meter and issued Jan. 1, 1985. The mechanical arrangements disclosed in these patents incorporate flow conduits having no pressure sensitive joints or sections, such as bellows or other pressure deformable portions. These flow conduits are solidly mounted in a cantilever fashion from their inlet and outlet ports. For example, the flow conduits can be welded or brazed to a support, so they can be oscillated in spring-like fashion about axes which are located near the solidly mounted sections of the flow conduits. Additionally the mounted flow conduits are preferably designed so they have resonant frequencies about the axes located near the solid mountings which are lower than the resonant frequencies about the axes relative to which Coriolis forces act. By so designing the flow conduits a mechanical situation arises whereby the forces opposing generated Coriolis forces are predominantly linear spring forces. The Coriolis forces, opposed by substantially linear spring forces, deflect the flow conduit about axes located between the portions of the flow conduits in which Coriolis forces are generated. The magnitude of the deflections are a function of the magnitudes of the generated Coriolis forces and the linear spring forces opposing the generated Coriolis forces.

As stated above the flow conduits in addition to being deflected by the Coriolis forces are also driven to oscillate. Accordingly, one portion of each flow conduit on which the Coriolis forces act will be deflected so as to move ahead, in the direction in which the flow conduit is moving, of the other portion of the flow conduit on which Coriolis forces are acting. The amount of time required after the first portion of the oscillating flow conduit deflected by Coriolis forces has passed a preselected point on the path of oscillation for the flow conduit to the instant when the second portion passes a preselected point is a linear function of the mass flow rate of the fluid passing through the flow conduit; i.e. the relationship between the measured time and the mass flow rate of the fluid passing through the flow conduit is only dependent on constants derived from the mechanics of the flow conduit and its solid mounting. This relationship is not dependent on variables other than time which must be measured or controlled. Optical sensors as described in U.S. Pat. No. Re. 31,450 and electromagnetic velocity sensors as described in U.S. Pat. Nos. 4,422,338 and 4,491,025 have been used for making the required time measurements from which mass flow rates of fluids can be determined.

A double flow conduit embodiment with sensors for making the necessary time measurements is described in U.S. Pat. No. 4,491,025. The double flow conduit embodiment described in U.S. Pat. No. 4,491,025 provides a Coriolis mass flow rate meter structure which is operated in a tuning fork manner as is also described in U.S. Pat. No. Re. 31,450. The tuning fork operation contributes to minimizing effects of external vibration forces. Minimizing effects of external vibration forces is important because these forces can induce errors in the required time measurement.

SUMMARY OF THE INVENTION

The density of fluids passing through Coriolis mass flow rate meters is always subject to change. For example, variable mixtures of constituents in a fluid or changes in the temperature of a fluid can alter fluid density. Changes in fluid density cause the masses of the oscillating flow conduits to also change and the variation of flow conduit mass in turn causes the resonance frequencies of the oscillating flow conduit to change. It is an object of the present invention to provide Coriolis mass flow rate meters which have the ratio of two resonance frequencies for each oscillating flow conduit maintained at a constant value irrespective of fluid density changes.

Flow conduits made from tubes having essentially uniform wall thickness of homogeneous material and mounted so they can be oscillated inherently have resonance frequencies for all modes of oscillation where the ratio of any two resonance frequencies remains constant irrespective of changes in the density of fluids passing through the flow conduit. Attaching weights to such flow conduits which do not have their masses altered by fluid density changes, such as sensor components and drive components for oscillating a flow conduit, does however change the ratio of resonance frequencies as fluid density changes unless the positions for the masses of the weights attached to the flow conduit are uniquely selected. It is an object of the present invention to determine the unique positions for mounting drive components and sensors components on flow conduits such that changes in fluid density do not alter the magnitude of the ratio of the resonance frequencies of the flow conduits about the axes relative to which the flow conduits are driven to oscillate and about the axes relative to which the flow conduits are deflected by Coriolis forces.

BRIEF DESCRIPTIONS OF THE DRAWINGS

The various objects, advantages and novel features of the present invention will be more readily apprehended from the following detailed description when read in conjunction with the appended drawings, in which corresponding components are designated by the same reference numerals throughout the various figures.

FIG. 1 is a perspective view of the flow conduit arrangement for a Coriolis mass flow rate meter which can be used with the present invention;

FIG. 2 is a graph showing the amplification factor for an oscillating structure versus the ratio of the frequency at which the structure is driven to osciallate over the resonance frequency for a mode of osciallation of the structure; and, FIG. 3 is a plan front view of a flow conduit with dimensions identified for specifying the locations for attaching sensors and driver components on the flow conduit which has the ratio of the resonance frequency about the A—A axis to the resonance frequency about the B—B axis maintained at a constant value that is independent of fluid density changes.

DETAILED DESCRIPTION OF THE INVENTION

Figure 1:
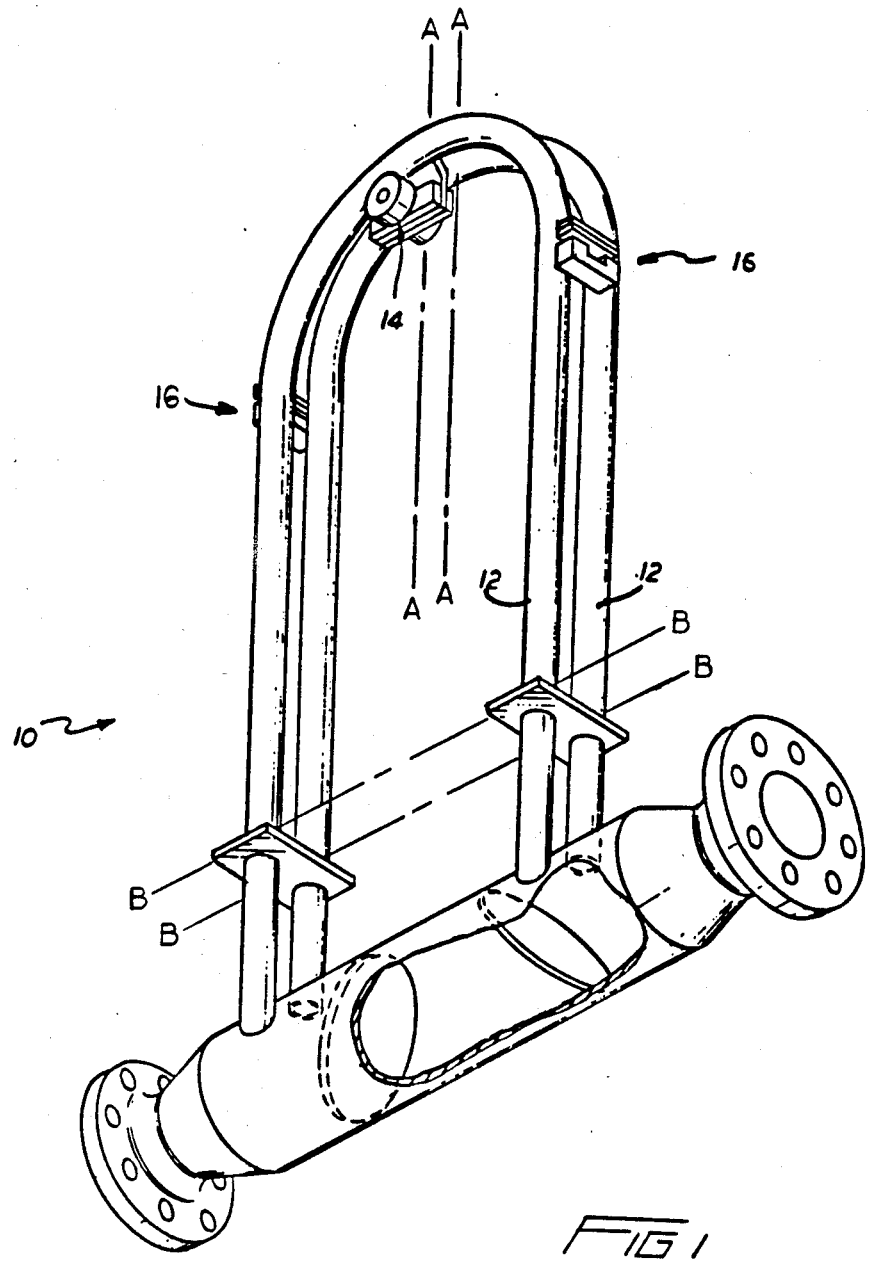

A Coriolis mass flow rate meter, as generally designated by numeral 10, for which the present invention can be used, is shown in FIG. 1. The flow meter 10 incorporates twin flow conduits 12. Other arrangements utilizing a single flow conduit and a spring arm, or a single light weight flow conduit solidly mounted to a relatively massive support can also be used with the present invention. The flow meter 10 in addition to the flow conduits 12 includes a driver 14, such as a permanent magnet and wire coil combination as is known in the art, to vibrate the flow conduits 12 as the prongs of a tuning fork. The flow meter 10 further includes sensors 16 mounted on the flow conduits 12. The sensors 16 shown in FIG. 1 are analog velocity sensors which provide signals linearly representative of the actual movement of the flow conduits 12 over their entire path of motion. When the flow conduits 12 are oscillating and fluid is flowing through them, the flow conduits 12 are deflected about axes A—A by Coriolis forces. The effects of these deflections are monitored by the sensor 16. A detailed description of the mechanical operation of flow meter 10 is set forth in the aforementioned U.S. Pat. No. Re. 31,450; and, U.S. Pat. No. 4,491,025.

The sensors 16 are electromagnetic velocity sensors. Each sensor, 16, consists of a permanent magnet and a coil, with the coil designed so as to always be moved within the essentially uniform magnetic field of the magnet. Descriptions of the operation of sensors 16 for single and twin conduit Coriolis mass flow rate meters are set forth in the aforementioned U.S. Pat. Nos. 4,422,338; and 4,491,025.

If the driver 14 and sensors 16 were not mounted on the flow conduits 12 then changes in the density of fluid passing through the flow conduits 12 would not alter the ratio of any of the resonance frequencies for the various modes of oscillation of the flow conduits 12. This situation results from the fact that without the attachment of the driver 14 and the sensors 16 all the resonance frequencies for the flow conduits 12 are functions of the various modal stiffnesses, $k_i$, and modal masses $M_i^C$ of the flow conduits 12 when filled with fluid. Specifically, the various resonance frequencies $\omega_i$ can be calculated from:

$$\omega_i = \sqrt{k_i/M_i^C} \qquad (1)$$

When the density of the fluid in the flow conduits 12 changes, all of the modal masses change by the same percentage. Therefore the ratio of any two resonance frequencies remains constant irrespective of fluid density changes. This universal situation is negated when constant masses, i.e. masses not altered by changes in fluid density, are attached to the flow conduits 12 because then the modal masses for the various modes of oscillation of the structure must be written as a summation. In such a case the resonance frequencies are calculated from the following relationship:

$$\omega_i = \sqrt{K_i/(M_i^C + M_i^A)} \qquad (2)$$

Where: $M_i^A$ are the masses of the attachments to the flow conduits 12 which are not altered by changes in fluid density.

It is seen from equation 2 that if the density of the fluid passing through the flow conduits 12 changes the resonance frequencies, $\omega_i$, all change in different proportions because the denominators include the summation of both density sensitive modal masses and density insensitive masses. Therefore, the ratio of any two resonance frequencies is expected to change as fluid density changes.

The flow conduits 12 of a preferred embodiment of flow meter 10 are driven to oscillate at the resonance frequency, $\omega_o$, for the mode of oscillation about the axes, B—B, by the driver 14. When fluid passes through the oscillating flow conduits 12, Coriolis forces cause the flow conduits 12 to deflect about the axes A—A at the same frequency as the driver 14 forces the flow conduits 12 to oscillate about the axes B—B.

Figure 2:
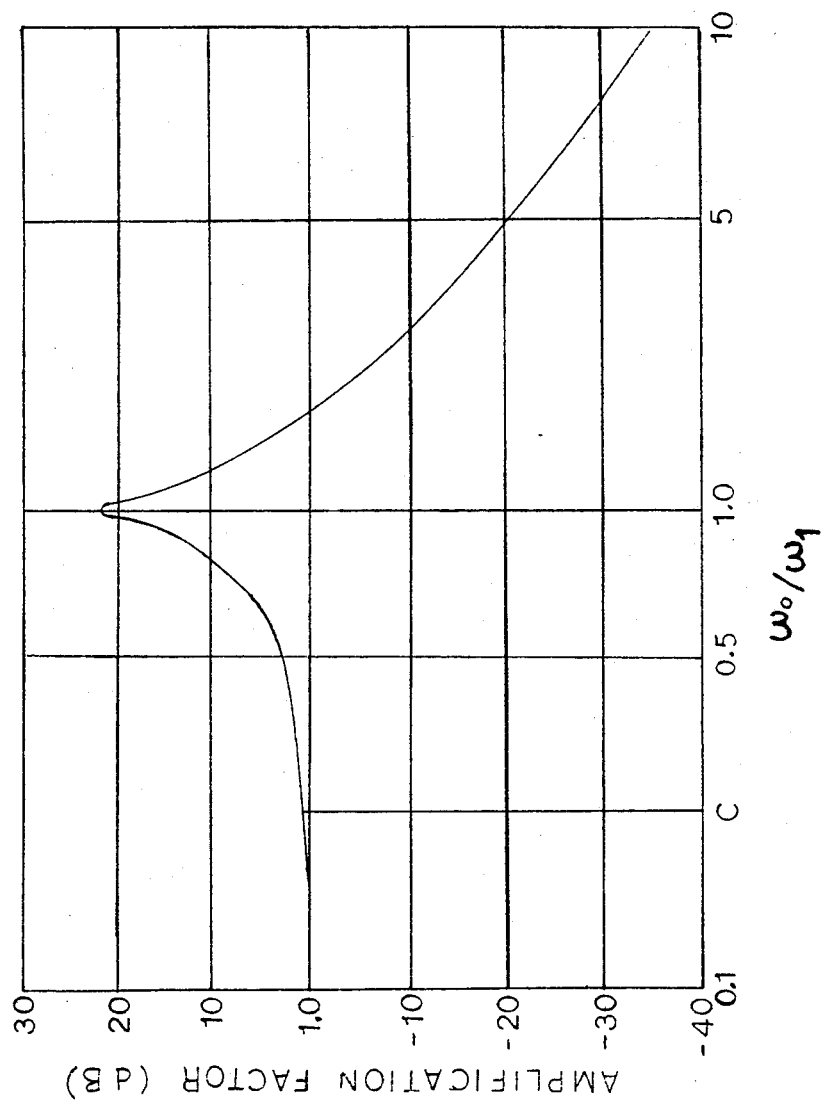

It is known in the art of analyzing mechanical oscillations that for each mode of oscillation of a mechanical structure a function description of the oscillatory motion can be written and that from these functions plots can be made of the amplification factor versus the ratio of the frequency at which a mechanical structure is driven to oscillate divided by the resonance frequency for the selected mode of oscillation of the structure. An exempliary discussion of relevant analysis of mechanical oscillations is set out in Greenwood, D. T., *Principles of Dynamics*, Prentice-Hall, pp 97-104 (1965). A plot is shown in FIG. 2 for such a function. At the value of one for the ratio of drive frequency, $\omega_o$, to resonance frequency, $\omega_1$, the amplification factor has its maximum value. This situation is true for structures having small damping forces, which is the case for the flow conduits 12 of the flow meter 10. The fluids which pass through the flow conduits 12 however can increase the damping forces on the flow conduits 12 and thereby decrease the amplification factor. In most practical applications, the effect of damping caused by fluids on the amplification factor is assumed to be a very negligible one which does not adversly effect the operation of Coriolis mass flow rate meters 10. Since the amplification factor is related to the magnitude of deflection of the structure, a large amplification factor means that when an oscillating structure is driven to oscillate at a resonance frequency large deflections will occur. Because the shape of the curve in FIG. 2 is very steep on both sides of the maximum amplification factor value any changes in the value of the ratio of the drive frequency to the resonance frequency causes a large change in the amplification factor. Applying these facts to the flow meter 10 and using FIG. 2, the response of the flow conduits 12 to Coriolis forces can be understood. From FIG. 2 it is seen that for deflections about the A—A axes the maximum amplfication factor will occur when the flow conduits 12 are driven to oscillate at the resonance frequency for oscillations about the A—A axes. In a preferred embodiment the flow conduits 12 are driven to oscillate resonantly about the B—B axes which has a lower frequency than the resonant frequency about the A—A axes. For the preferred embodiment this difference in frequencies results in the flow conduits 12 operating at an amplification factor of approximately 1.2 as shown in FIG. 2 by the line labeled C which has a $\omega_o/\omega_1$ value of approximately 0.4. The range of acceptable amplification factors can be from greater than one (1.0) to five (5.0).

It is advantageous to maintain an essentially constant amplification factor because the amount of deflection for flow conduits 12 about the A—A axes is determined by the magnitude of Coriolis forces and the amplification factor. If the amplficiation factor is not maintained at an essentially constant value, errors will arise in the determination of the mass flow rate of fluid passing through the deflected flow conduits 12. Previously, the control of the amplfication factor for flow meters was addressed by operating the flow conduits 12 at ratios of the drive frequency to resonance frequency having values where the amplfication factor was essentially one, i.e. to the left of the line C in FIG. 2. By so designing the flow conduits 12 with its attachments results in the situation where changes in the ratio of drive frequency to resonance frequency posed a relatively small problem because the amplification factor was nearly constant. However, if increased sensitivity is desired the amplification factors must be above one. Here the prior design approach is no longer acceptable. As seen from FIG. 2 it is necessary to keep the ratio of the frequency at which the flow conduits 12 are driven to oscillate to the resonance frequency about the A—A axes, i.e. $\omega_o/\omega_1$, essentially constant in order to have an essentially constant amplification factor above one.

For flow conduits 12 with driver 14 and sensors 16 attached to the flow conduits 12 it has been found with the present invention that it is possible to maintain the ratio of drive frequency to the resonance frequency constant independent of fluid density changes.

The flow conduits 12 can be analyzed as a six degree of freedom mechanical structure having the following equations of motion:

$$M_i \ddot{X}_i + K_i^X X_i = 0$$

$$J_i \ddot{\theta}_i + K_i^\theta \theta_I = 0$$

where
$M_i$ are the modal masses for the structure;
$X_i$ are the translational displacements of the modal masses along three perpendicular translation axes;
$J_i$ are the modal inertias for the structure;
$\theta_i$ are the angular displacements of the modal masses about three perpendicular rotation axes;
$K_i^X$ are the translational modal stiffnesses of the structure along the three translation axes; and;
$K_i^\theta$ are the rotational modal stiffnesses of the structure about the three rotation axes.

From these general equations, which have solutions for all modes of oscillation of the flow conduits 12 in all directions, the specific resonance frequency, $\omega_o$, about the B—B axes for the flow conduits 12 can be calculated from: $\omega_o = \sqrt{K_i^B/M_i}$, and the specific resonance frequency, $\omega_1$, about the A—A axes can be calculated from: $\omega_1 = \sqrt{K_i^A/M_i}$.

Where
$K_i^B$ are the modal stiffnesses of the flow conduits 12 with respect to the B—B axes; and,
$K_i^A$ are the modal stiffnesses of the flow conduits 12 with respect to the A—A axes.

Since the motion about the A—A axes is torsional, as shown in the second equation of motion and the descriptions of the terms therein, the specific resonance frequency about the A—A axes can also be written as $\omega_1 = \sqrt{K_i^\theta/J_i}$, since $K_i^A = K_i^\theta$ and $M_i = J_i$ for this mode. Since the modal stiffnesses, $K_i^A$ and $K_i^B$, are constants and the ratio of $\omega_o/\omega_1$, is to be held constant the following relationship has to be obtained for the flow conduits 12:

$$J_i/M_i = \text{constant} \qquad (3)$$

This equation as written is only accurate for flow conduits 12 without attachments having masses that are independent of fluid density variations. When attachments, e.g. driver 14 and sensors 16, are fixed onto flow conduits 12, it has been found equation (3) must be rewritten as:

$$\frac{J_i(\rho) + J}{M_i(\rho) + M} = \text{constant} \qquad (4)$$

where
$J_i(p)$ are modal inertias for the conduits 12 and the contained fluid which is dependent on density;
$M_i(p)$ are the modal masses of the flow conduits 12 and the contained fluid which is dependent on density;

J is the total rotational inertia about the A—A axes of the attachments to flow conduits 12 which are independent of fluid density; and M is the total mass of the attachments to flow conduits 12 which are independent of fluid density.

It has been found for the present invention that to have the left side of equation (4) equal a constant irrespective of changes in fluid density the following relationship must be maintained:

$$\frac{M_i(\rho)}{J_i(\rho)} = \frac{M}{J} \tag{5}$$

In designing flow meters 10 to have constant ratios of the drive resonance frequency to the resonance frequency about the A—A axes the modal inertias and modal masses, which are solutions of equation (5) for the flow conduits 12, must be determined by either calculation or experiment. These modal masses and inertias must be determined with all of the attachments, e.g. driver 14 and sensors 16, mounted on the flow conduits 12 that are necessary for operation of flow meter 10. To determine the modal masses and inertias the following procedure is used:

1. The resonant frequency, $\omega_0^1$, for oscillation of the flow conduits 12 without any attachments about the B—B axes is determined either experimentally or by using an analytical method such as a finite element computer program.
2. Next each of the attachments, i.e. the driver 14 and sensor 16 components, are assigned locations on the flow conduits 12, and the resonant frequency, $\omega_0$, for oscillation of the flow conduits 12 with the attachments having a total mass M about the B—B axes is determined either experimentally or by using an analytical method such as a finite element computer program.
3. The following relationships then are used to determine the modal masses for the oscillations about the B—B axes:

$$(\omega_0^1)^2 = K_i^B/M_i(\rho) \tag{6}$$

$$\omega_0^2 = K_i^B/(M_i(\rho)+M) \tag{7}$$

Solving equations (6) and (7) for $M_i(\rho)$ shows:

$$M_i(\rho) = \frac{M}{\left(\frac{w_0'}{w_0}\right)^2 - 1} \tag{8}$$

4. The steps 1 through 3 are now repeated for oscillations of the flow conduits 12 about the A—A axes to determine the modal inertias $J_i(\rho)$. Unlike the calculations for modal masses, however, modal inertia calucations require a combination of the mass M of each attachment and the perpendicular distance, r, of the attachment from the A—A axis in the form $Mr^2$. After the resonant frequency, $\omega_1'$, for oscillations of the flow conduits 12 about the A—A axes without any attachments, and the resonant frequency, $\omega_1$, for oscillations of the flow conduits 12 about the A—A axes with attachments are determined, the following relationships can be used:

$$(\omega_i')^2 = K_i^A/J_i(\rho) \tag{9}$$

$$\omega_1^2 K_i^A/(J_i(\rho)+J) \tag{10}$$

Solving equations (9) and (10) for the modal inertias $J_i(\rho)$ the following is obtained.

$$J_i(\rho) = \frac{J}{\left(\frac{w_1'}{w_1}\right)^2 - 1} \tag{11}$$

Now using the above procedures for a selected pair of flow conduits 12 and selected masses for the components of driver 14 and sensors 16, and for selected positions of the attachments on flow conduits 12 all of the necessary characteristics of the flow conduits 12 with their attachments are known. If the ratio of resonance frquencies about the A—A, and B—B, axes will be insensitive to fluid density changes equation (5) must be satisfied, i.e.:

$$\frac{M_i(\rho)}{J_i(\rho)} = \frac{M}{J} \tag{5}$$

The positions for mounting sensors 16 and driver 14 components on the flow conduits 12 and the masses of the components are varied until equation (5) is satisfied.

Flow meters 10 of the type shown in FIG. 1 have three locations for each flow conduit 12 where attachments are made. One location is for the components of the driver 14, and two locations are for the components of the sensors 16. It is required that the driver 14 components be mounted on the A—A axes of flow conduits 12. This fact arises from the requirement to drive the flow conduits 12 to oscillate about the B—B axes and not to impose oscillations of the flow conduits 12 about the A—A axes by the forces from the driver 14. In so mounting the driver 14 essentially on the A—A axes, the inertia J is essentially unaffected by the attachment of the driver 14 components to the flow conduits 12. Thus the critical attachments are the sensor 16 components. These sensor 16 components must be positioned essentially adjacent to the flow conduits 12 at the widest separation to sense the maximum signals and to have the shortest mounting distance from the flow conduits 12 so as to minimize extraneous harmonic motions of mounted sensor 16 components. Therefore, the preferable positions of the components for the driver 14 and the sensors 16 on the flow conduits 12 are localized and the determination of the unique combination of driver 14 and sensor 16 component masses and mounting locations on flow conduits 12 where equation (5) is satisfied can be determined using the procedure disclosed above.

Figure 3:
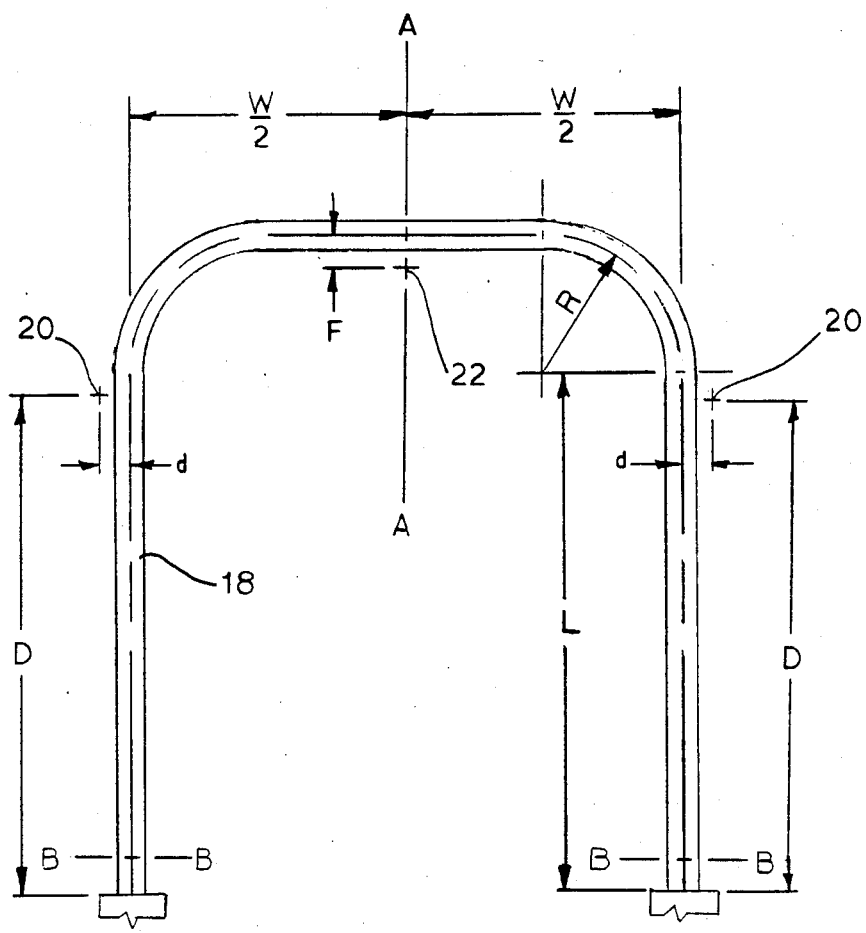

Using the procedure described above a pair of flow conduits 12 with driver 14 and sensors 16 components attached to the flow conduits 12 were designed and tested to verify that the combinations provided a ratio of resonance frequencies about the A—A and B—B axes which was independent of fluid density changes. The flow conduits 12 were made from seamless 316L stainless steel tubing, 18, (see FIG. 3) per American Society for Testing Materials (ASTM) No. A-632. The tubing 18 had an outside diameter of 1.110 centimeters and a wall thickness of 0.071 centimeters, and was bent so as to have the dimensions set out below in Table I:

TABLE I

| Parameter | (see FIG. 3) Dimension (centimeters) |
|---|---|
| L | 19.050 |
| R | 5.080 |
| W | 20.320 |

For driver 14 and sensors 16 having components of equal mass and with the tubing 18 the procedure of this invention was used to calculate the locations, 29, for mounting the components of sensors 16 (see FIG. 3) and the location, 22, for mounting the components of driver 14 to provide an arrangement which has an essentially constant ratio of resonance frequencies about the A—A and B—B axes that is independent of fluid density changes. The dimensions for the calculated locations where the components of drivers 14 and sensors 16 are mounted with respect to the tubing 18 is set out below in Table II.

TABLE II

| Parameter | (see FIG. 3) Dimension (centimeters) |
|---|---|
| D | 15.240 |
| d | 0.871 |
| F | 0.871 |

Using the arrangements set out in Table I and Table II with driver 14 and sensor 16 components having 325 grain masses the operational parameters set out in Table III were calculated and experimentally measured as indicated for a tubing 18 filled with either air having a specific gravity of zero or water having a specific gravity of one.

TABLE III

| Mode of Oscillation (Hertz) | Fluid | Resonance Frequency Measured (Hertz) | Resonance Frequency Calculated (Hertz) |
|---|---|---|---|
| $\omega_0$ | air | 94.475 | 89.546 |
| $\omega_1$ | air | 223.500 | 224.639 |
| $\omega_0$ | water | 84.500 | 83.360 |
| $\omega_1$ | water | 199.800 | 208.233 |

$\omega_0$ is for oscillations about the B—B axis and $\omega_1$ is for oscillations about the A—A axis.

For the results set out in Table III the following ratio of resonance frequencies are obtained.

TABLE IV

| Fluid | Measured | Calculated |
|---|---|---|
| air | 0.423 | 0.399 |
| water | 0.423 | 0.400 |

These results show that for the experimentally measured resonance frequencies there is no difference between the resonance frequency ratios for air and water. While for the calculated resonance frequencies there is a 0.25 percent difference in the ratios. This difference is neglible in actual meters as is demonstrated by the measured results also set out in Table IV. In another embodiment, the procedure of steps 1-4, page 14-16, can be usec by taking the modal inertias relative to the B—B axes and the modal masses relative to the A—A axes.

Other embodiments of the invention will be apparent to those of skill in the art from consideration of this specification or practice of this invention. The specification is intended as exemplary only with the true scope of the invention being indicated by the following claims.

What is claimed is:

1. A method for designing Coriolis mass flow rate meters having flow conduits with essentially uniformly thick walls made of a homogeneous material, each of said flow conduits driven to oscillate resonantly, comprising:
  (a) determination of a first frequency for said flow conduit, having no attachments, about the axis relative to which the flow conduit is driven to oscillate;
  (b) determination of a second resonant frequency for said flow conduit, with all attachments to said flow conduit required for operation of said flow meter, about the axis relative to which said flow conduit is driven to oscillate;
  (c) determination of the modal mass for said flow conduit as a function of the determined first and second resonant frequencies and of the masses of said attachments;
  (d) determination of a third resonant frequency for said flow conduit, having no attachments, about the axis relative to which said flow conduit is deflected by Coriolis forces;
  (e) determination of a fourth resonant frequency for said flow conduit, with all attachments to said flow conduit required for operation of said flow meter, about the axis relative to which said flow conduit is deflected by Coriolis forces;
  (f) determination of the modal inertia for said flow conduit as a function of the determined third and fourth resonant frequencies and of the inertias of said attachments about the axis relative to which said flow conduit is deflected by Coriolis forces; and
  (g) changing the masses and locations of mounting of said attachments to said flow conduit so that the ratio of the modal mass to modal inertia equals the ratio of the mass of said attachments to the inertia of said attachments about the axis relative to which said flow conduit is deflected by Coriolis forces, thereby having the ratio of the second resonant frequency to the fourth resonant frequency equal a constant.

2. A method according to claim 1 wherein said attachments include drive means for forcing said flow conduit to oscillate and sensor means for sensing deflections of said flow conduit.

3. A method according to claim 1 wherein said Coriolis mass flow rate meter has an amplification factor in the range of greater than one (1.0) to about five (5.0).

4. A method for designing Coriolis mass flow rate meters having flow conduits with essentially uniformly thick walls made of a homogeneous material, each of said flow conduits driven to oscillate resonantly, comprising:
  (a) determination of a first resonant frequency for said flow conduit, having no attachments, about the axis relative to which the flow conduit is driven to oscillate;
  (b) determination of a second resonant frequency for said flow conduit, with all attachments to said flow conduit required for operation of said flow meter, about the axis relative to which said flow conduit is driven to oscillate;
  (c) determination of the modal inertia for said flow conduit as a function of the determined first and second resonant frequencies and of the inertias of said attachments about the axis relative to which said flow conduit is driven to oscillate;

(d) determination of a third resonant frequency for said flow conduit, having no attachments, about the axis relative to which said flow conduit is deflected by Coriolis forces;

(e) determination of a fourth resonant frequency for said flow conduit with all attachments to said flow conduit required for operation of said flow meter, about the axis relative to which said flow conduit is deflected by Coriolis forces;

(f) determination of the modal mass for said flow conduit as a function of the determined third and fourth resonant frequencies and of the masses of said attachments; and (g) changing the masses and locations of mounting of said attachments to said flow conduit so that the ratio of the modal mass to modal inertia equal the ratio of the mass of said attachments to the inertia of said attachments about the axis relative to which said flow conduit is driven to oscillate, thereby having the ratio of the second resonant frequency to the fourth resonant frequency equal a constant.

5. A method according to claim 4 wherein said attachments include drive means for forcing said flow conduit to oscillate and sensor means for sensing deflections of said flow conduit.

6. A method according to claim 4 wherein said Coriolis mass flow rate meter has an amplification factor in the range of greater than one (1.0) to about five (5.0).

* * * * *